United States Patent

[11] 3,539,045

[72] Inventor Harold Sinclair
   Kensington, England
[21] Appl. No. 755,136
[22] Filed Aug. 26, 1968
[45] Patented Nov. 10, 1970
[73] Assignee Synchro-Drives Limited
   London, England
[32] Priority Aug. 31, 1967
[33] Great Britain
[31] 39,872/67

[54] DEVICE FOR SYNCHRONIZING THE ENGAGEMENT OF A FLUID COUPLING LOCK-UP CLUTCH
4 Claims, 18 Drawing Figs.

[52] U.S. Cl. ............................................. 192/.076,
   192/.098, 192/3.3, 192/53, 192/103, 192/114,
   74/483, 115/34
[51] Int. Cl. ............................................ F16d 67/00
[50] Field of Search ............................................ 192/.07,
   .075, .096, .098, .052, 073, 3.28, 3.29, 3.3, .076;
   115/34

[56] References Cited
UNITED STATES PATENTS

| | | | |
|---|---|---|---|
| 2,386,285 | 10/1945 | Zeidler | 192/3.28 |
| 2,454,614 | 11/1948 | Peterson et al. | 192/.07 |
| 2,641,342 | 6/1953 | Hasbrouck | 192/3.3 |
| 2,723,735 | 11/1955 | Banker | 192/3.3 |
| 2,727,606 | 12/1955 | Lapsley | 192/3.28 |
| 2,789,448 | 4/1957 | Lapsley | 192/3.3 |
| 2,935,891 | 5/1960 | Morse | 192/.098 |
| 3,068,974 | 12/1962 | Jandasek | 192/.075 |
| 3,131,575 | 5/1964 | Shimanckas | 192/.098 |
| 3,228,503 | 1/1966 | Maurice | 192/.096 |
| 3,418,872 | 12/1968 | Vernati | 192/.07 |

Primary Examiner—Benjamin W. Wyche
Attorney—Woodcock, Phelan & Washburn

ABSTRACT: In a marine propulsion system wherein a hydraulic turbocoupling of controllable filling type and a toothed clutch are connected in parallel between an engine and a pinion shaft geared to a propeller, actuation of a clutch lever to engage the clutch is prevented by a first latch mechanism associated with an engine power control lever, except when the vessel is in ahead motion at relatively high speed, and a second latch mechanism prevents actuation of the clutch lever to engage the clutch except when the pinion shaft is rotating at relatively high speed in the ahead direction. Hence the clutch lever can be actuated to engage the clutch only when the impeller and runner of the turbocoupling are rotating at high speed and at a low relative speed, such that the turbocoupling exerts a powerful synchronising action on the toothed clutch elements, which are also rotating at a low relative speed, such as to facilitate engagement of the clutch.

DEVICE FOR SYNCHRONIZING THE ENGAGEMENT OF A FLUID COUPLING LOCK-UP CLUTCH

This invention relates to marine propulsion systems comprising at least one reversible engine geared to drive a fixed pitch propeller, and a controllable hydraulic turbocoupling, the working circuit of which can be selectively filled or emptied, together with a toothed clutch in parallel with the turbocoupling between the engine and the pinion shaft of the gearing, so that when the clutch is engaged, e.g. during ahead propulsion at normal speed, the drive is transmitted direct from the engine to the pinion shaft, whereby to eliminate the slip loss in the turbocoupling.

An important application of such a system is to a marine propulsion system wherein the engine is a medium-speed reversible diesel engine transmitting its power through a torsionally flexible coupling and driving a fixed pitch propeller through the hydraulic turbocoupling and reduction gearing; the toothed clutch being engaged during normal ahead propulsion of the vessel and disengaged during manoeuvring of the vessel when the propeller is advantageously driven via the hydraulic turbocoupling. With such a reversible diesel engine the load conditions are known to be decidedly easier when driving through a hydraulic turbocoupling having inherently suitable torque and speed characteristics for the requirements of starting and stopping and reversing the rotation of the propeller while the vessel is in motion, as compared with the operation of a reversible engine that is positively coupled to the propeller. In marine propulsion systems wherein there are two or more reversible diesel engines driving through respective hydraulic turbocouplings geared to the shaft of a fixed pitch propeller, manoeuvring is most conveniently effected, in the case in which a pair of engines is used, by running one engine in the ahead direction and the other engine in the astern direction, and driving the propeller in the ahead or astern direction as required by selectively filling or emptying the hydraulic turbocoupling associated with the ahead or astern running engine respectively; the power output of the selected engine being controlled to drive the propeller at the required speed while the other engine runs at its idling speed with its associated hydraulic turbocoupling empty.

In some circumstances however, only one engine is in service, and the other engine is shut down. Hence manoeuvring has to be carried out at such times with only one engine viz. by direct reversing of the engine, as in a single-engined vessel; for which class of vessel also the invention can be used with advantage.

An example of a proposed system incorporating a hydraulic turbocoupling wherein provision is made for driving directly through a toothed clutch to eliminate slip loss in the coupling is described and illustrated in British Pat. specification No. 484,394, and the difficulties that would arise with the use of a toothed clutch are described therein. Because of such difficulties it has not hitherto been considered practical to use such a clutch in parallel with a turbocoupling.

The object of the present invention is to overcome the problems associated with the engagement of a direct drive toothed clutch, in marine propulsion systems incorporating one or more engines each with a hydraulic turbocoupling, geared to drive a propeller shaft; with particular reference to the use of a plurality of reversible diesel engines with hydraulic turbocouplings geared in groups to drive a fixed pitch propeller.

In such marine propulsion systems it has long been recognized that the torque/speed characteristic of a hydraulic turbocoupling working in the full condition corresponds closely with the torque/speed characteristic of the propeller that it is driving, such that the low value of percentage slip that is normal in such a turbocoupling in the full speed condition is substantially constant at all operating speeds over the working speed range of the engine and propeller.

However, it seems not to have been recognized that the basic characteristics of a full or substantially full hydraulic turbocoupling can be utilised, with appropriate control of the power and speed conditions, to constitute powerful speed synchronising means, whereby to make it practicable to engage the driving and driven elements of a toothed clutch operatively mounted in parallel with the hydraulic turbocoupling, whereby to eliminate slip loss therein during normal ahead propulsion.

The long established practice in connection with geared diesel engine propulsion machinery incorporating hydraulic turbocouplings has been to provide with each engine a turbocoupling of "full size", viz. one that is large enough to transmit the full power output at full speed of the engine, with a low value of slip e.g. about 2½ percent to 3½ percent; and to tolerate the slip loss and resulting slight increase in fuel consumption during long periods of ahead propulsion, having regard to the valuable torsional vibration damping properties of the hydraulic turbocoupling located between the engine and the pinion of the reduction gearing.

However, if a simple multiple tooth clutch of low cost could be provided in parallel with a hydraulic turbocoupling for engagement of the clutch to eliminate the slip loss therein during normal ahead propulsion, it would become practicable to utilise an "undersized" hydraulic turbocoupling of considerably lower cost, viz. one that is large enough to transmit the full power of the engine at full speed but with a much higher slip loss, e.g. 6 percent to 8 percent, which can be tolerated for relatively short working periods.

The engine would require to be provided with a torsionally flexible coupling of suitable characteristics for the rigidly clutched condition. The capital cost of the complete hydraulic turbocoupling and direct drive clutch assembly would be no greater than the capital cost of a full-sized hydraulic turbocoupling with its attendant slip loss and added fuel consumption.

In a typical case, with such an "undersized" turbocoupling a twin-engined vessel would have direct reversing engines each of 8,000 HP at 450 r.p.m., the pinion shaft speed being about 420 r.p.m. at full power, the differential speed being 30 r.p.m.; in a single-engine operating condition in such a vessel pinion shaft speed would decrease to about 295 r.p.m., maximum, and the engine speed would be of the order of 340 r.p.m. when at full load torque; the differential speed of the clutch elements then being about 45 r.p.m.

Supposing now that under steady load conditions the engine fuel control were to be moved briefly to the slow speed ahead setting, the slip in the hydraulic turbocoupling would fall to a low value and then to zero and become negative at a very low value, due to the powerful near-synchronising effect of the hydraulic turbocoupling at the reduced but still relatively high rotational speeds of the engine and pinion shaft under the foregoing conditions; such that the differential rotational speed would be very low indeed, e.g. of the order of 2 r.p.m., and it would be quite practicable to engage a toothed clutch of simple design.

The powerful synchronising action of the hydraulic turbocoupling is effective during the foregoing conditions of rotational speed at low torque in maintaining the driving and driven elements of the clutch at near synchronism, viz. with a low relative rotational speed as is favourable for engagement of a toothed clutch.

In the case of a twin-engined vessel with both engines in operation in the ahead direction at full power, the effect of moving the fuel control of one engine to the slow speed setting while the fuel control of the other engine remains at full load setting is to reduce the slip in the hydraulic turbocoupling associated with the first-mentioned engine to an extremely low value as described above to facilitate the engagement of the toothed clutch.

In accordance with the invention there is provided a marine propulsion system comprising at least one reversible engine, power output control means for said engine, a fixed pitch propeller, a pinion shaft drivably connected to said propeller, a hydraulic turbocoupling of the type that includes an impeller and a runner and in which the working circuit can be selectively filled and emptied, a toothed clutch, volitionally operable clutch control means for selectively engaging and disengaging said clutch, said turbocoupling and said clutch being connected in parallel with one another between said engine and said pinion shaft, and the improvement that includes first additional control means associated with said clutch control means and effective to permit operation of said clutch control means to actuate said clutch towards the engaged condition for direct drive of said propeller by said engine only when said pinion shaft is in a condition of rotation corresponding to ahead motion of the vessel at at least a predetermined high speed, and second additional control means associate with said engine power control means and effective to permit operation of said clutch control means to actuate said clutch towards the engaged condition only when said engine power output control means are set for ahead propulsion of the vessel, at a predetermined setting that corresponds to less than full engine power.

The said control means preferably include mechanism related to the power control of the engine to prevent the clutch from being actuated towards the direct drive condition except when the said power control is moved from a high power ahead setting to a lower power ahead setting.

Figure 17:
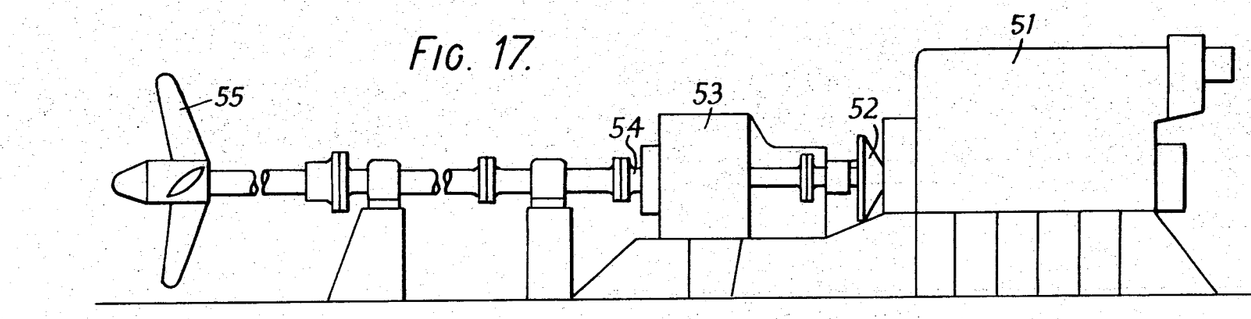
FIG. 17 is a view in side elevation of a propulsion system incorporating the invention.
Figure 18:
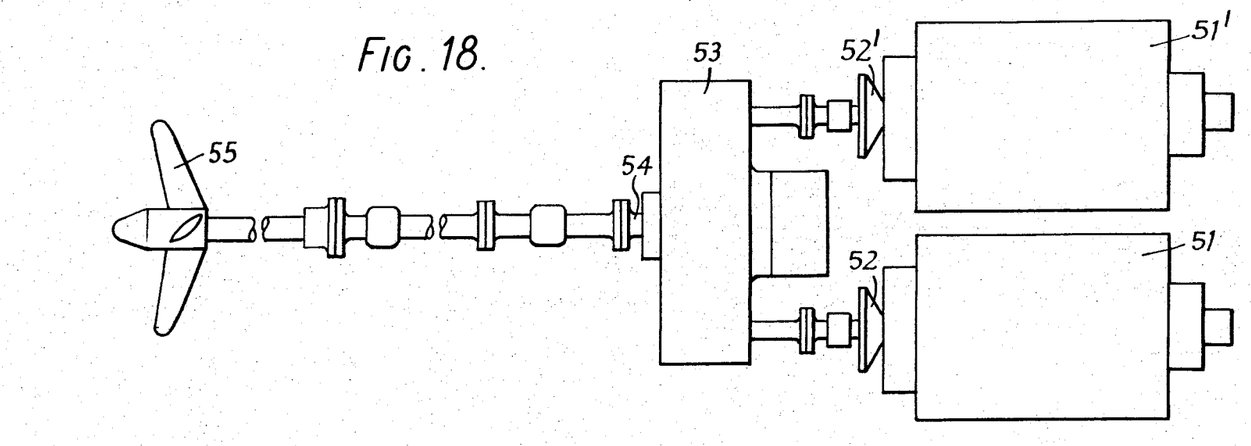
FIG. 18 is a plan view of the propulsion system shown in FIG. 17.

The propulsion system illustrated includes two direct reversing diesel engines 51, 51' (FIGS. 17 and 18) which transmit their power through torsionally flexible couplings 52, 52' to shafts 4, 4' which as will be described are the impeller shafts of two hydraulic turbocouplings. The turbocouplings and their associated toothed clutches are mounted within a housing 53, in which is also housed reduction gearing the output shaft 54 of which is drivably coupled to a fixed pitch propeller 55. Detailed description will be given of only the hydraulic turbocoupling and toothed clutch associated with the engine 1, and of only the pump driven by the pinion shaft associated with the said hydraulic turbocoupling and toothed clutch.

Figure 1:
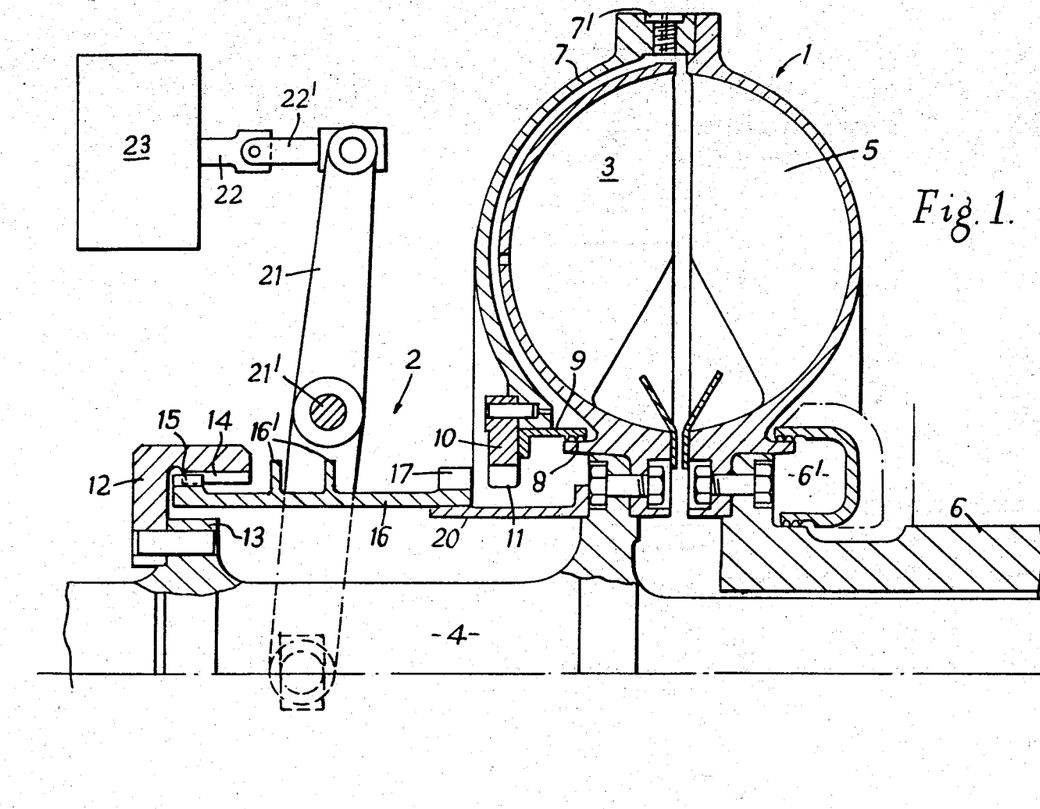
FIG. 1 is one half of a longitudinal section of part of a marine propulsion system in accordance with the invention, wherein the toothed clutch in parallel with the hydraulic turbocoupling has flat-ended teeth, the clutch being shown in the disengaged condition.
Figure 2:
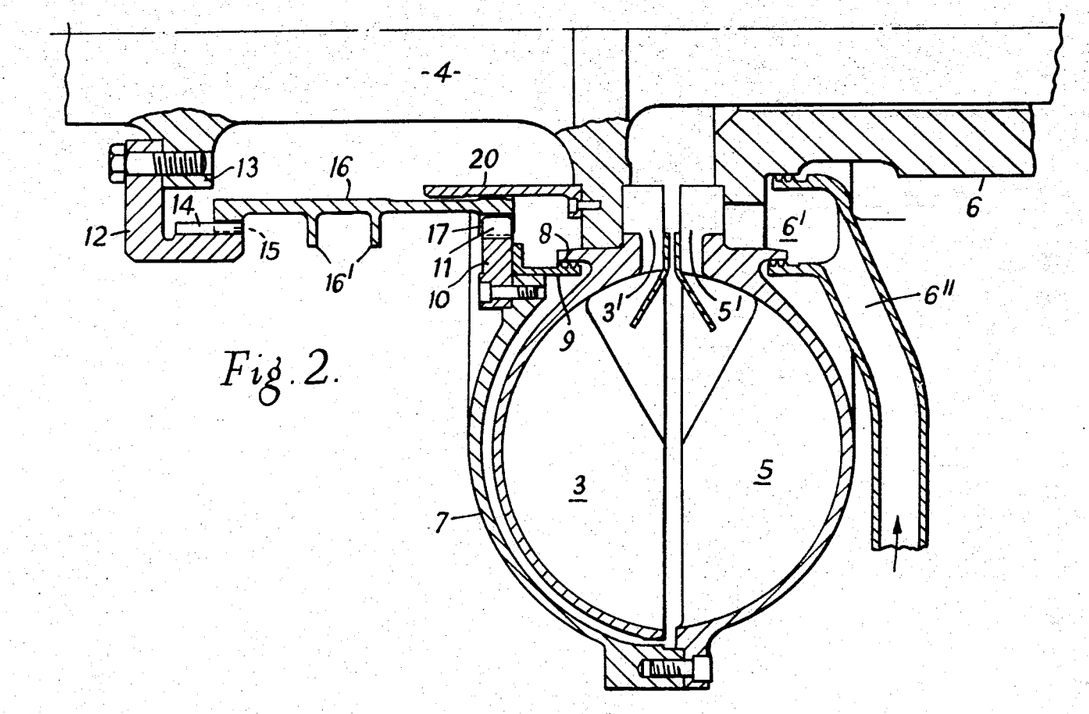
FIG. 2 is the other half of the longitudinal section of the system, showing the clutch in the engaged condition.

In FIGS. 1 and 2 the hydraulic turbocoupling, which is of the controllable type, is indicated generally by reference numeral 1, and the toothed clutch which is servo-actuated and is connected in parallel with the turbocoupling, is indicated generally by reference numeral 2. The turbocoupling 1 includes a vaned rotor 3 mounted on the shaft 4 to which the engine 51 is drivably coupled, and a vaned rotor 5 mounted on the pinion shaft 6, the rotor 3 constituting the impeller of the turbocoupling and the rotor 5 constituting the runner of the turbocoupling. The said impeller and runner together define a working circuit wherein during operation of the full turbocoupling a vortex ring of working liquid is formed. A stationary manifold, part of which is shown at 6', is provided for filling the working circuit, oil delivered by a pump (not shown) to the manifold 6' via a filling duct 6'' passing to the working circuit through ports 5' and 3'.

Figure 3:
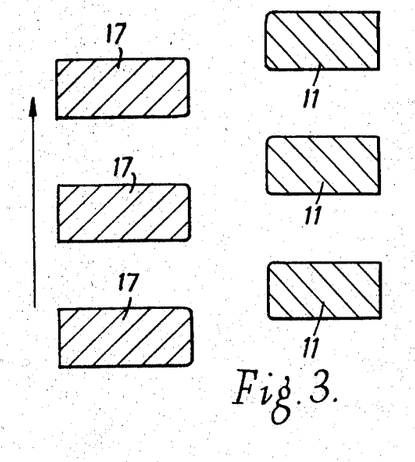
FIG. 3 is a development view of the interengageable clutch teeth, showing the teeth in a disengaged condition.
Figure 4:
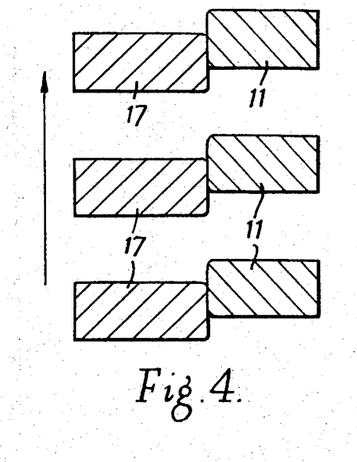
FIG. 4 is a development view showing the clutch teeth in an end-nuzzling condition, momentarily prior to full interengagement.
Figure 5:
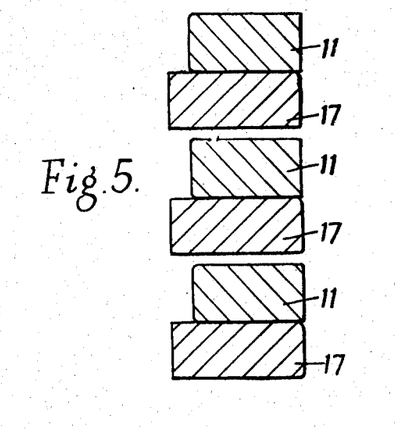
FIG. 5 is a development view showing the clutch teeth interengaged, under positive driving torque.
Figures 6, 7:
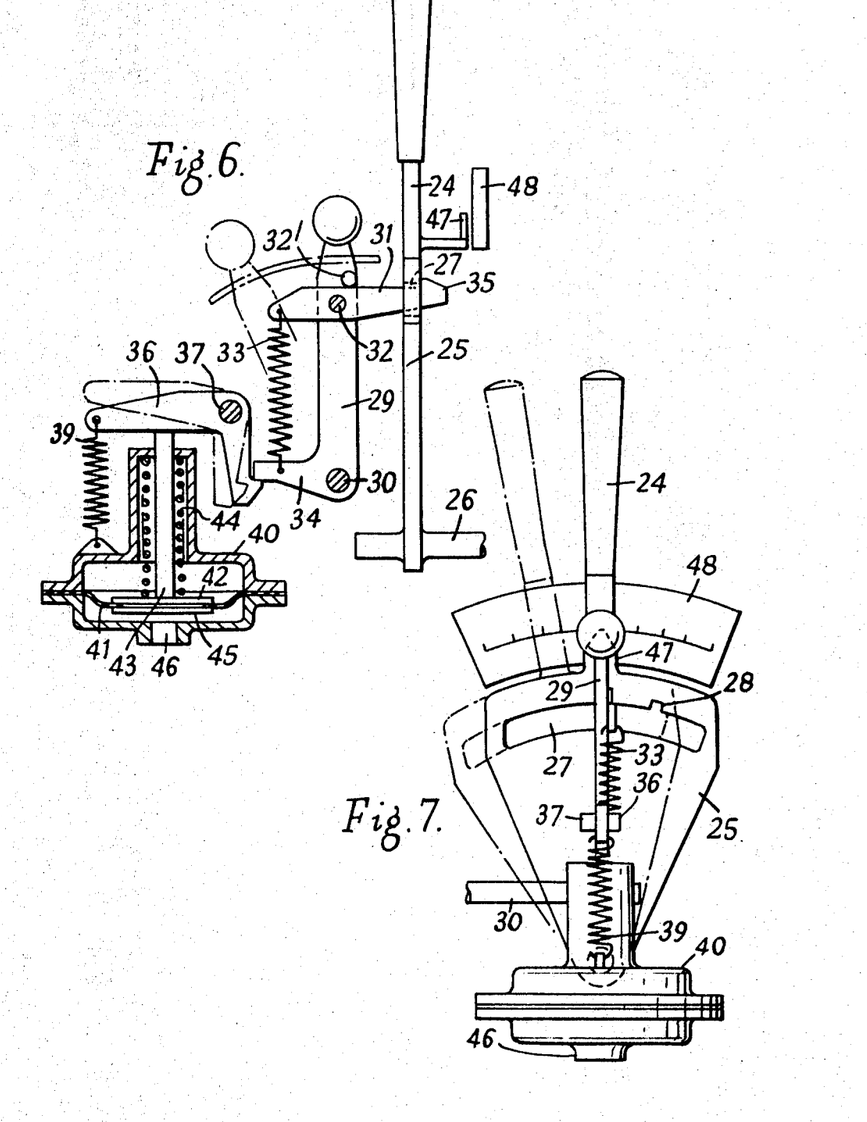
FIG. 6 is a side view of control mechanism, with an interlock diaphragm casing in section.
FIG. 7 is a front view of the control mechanism.

The runner 5 is connected to a rotatable casing 7 that extends over the back of the impeller 3, a labyrinth-type oil seal 8 being provided between the cylindrical part formed on the boss of the impeller 3 and a ring 9 on the radially inner part of the casing 7. The casing 7 carries restricted leak-off nozzles, one of which is shown at 7'. A clutch ring 10 bolted to the radially inner part of the casing 7 is formed with a ring of internal teeth 11, forming the driven part of the multiple tooth clutch 2. The clutch also includes a ring 12 bolted to a flange 13 on the input shaft 4 and formed with a ring of internal clutch teeth 14, with which are continuously engaged external clutch teeth 15 formed on one end of a clutch sleeve 16, the other end of which constitutes the driving part of the clutch and is formed with a ring of external clutch teeth 17. When the clutch is in a disengaged condition, as shown in FIG. 1, the clutch sleeve 16 is supported at one end by the interengaged clutch teeth 14 and 15 and at its other end by a sleeve 20 carried by the input shaft 4. A clutch-actuating lever 21 is pivotally connected at 21' to a stationary part of the mechanism, and at the lower end in FIG. 1 the lever 21 is of forked shape for operative engagement with a groove formed between flanges 16' on the clutch sleeve 16. The upper end of the lever 21 is linked via a link 22' to a piston rod 22 of a fluid pressure operated clutch control servomotor 23. As shown in FIGS. 3 to 5, the opposed faces of the clutch teeth 11 and 17 are flat, with radiused corners.

Figure 16:
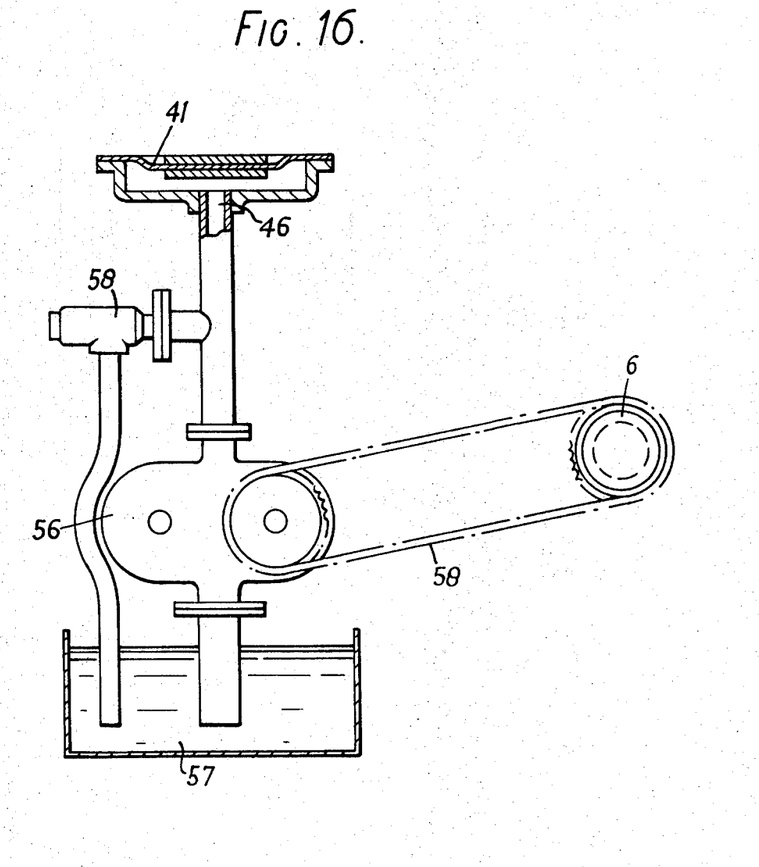
FIG. 16 shows a pump associated with a pinion shaft of reduction gearing.

Referring now to FIGS. 6 to 10, the control mechanism comprises an engine power control lever 24 mounted upon a quadrant 25 fixed on a rod 26 rotatably mounted in stationary supports (not shown). The quadrant 25 is formed with an arcuate slot 27 in which a notched recess 28 is formed. A clutch control lever 29 is fixed on a rod 30 rotatably mounted in stationary supports (not shown) and adapted to control the supply of fluid under pressure to and its relief from the servomotor 23. A latch interlock lever 31, pivotally connected to the clutch control lever 29 at 32, has one end connected by a tension spring 33 to an arm 34 of the clutch valve control lever 29, and the other end of the latch interlock lever 31 is formed with a hooked projection 35 which is capable of passing through the notched recess 28 when the power control lever 24 and quadrant 25 are correctly positioned relative to the lever 29 (see FIG. 10). A bellcrank latch lever 36 carried by a rod 37 rotatably mounted in stationary supports (not shown) is formed at one end with a latch formed by a hooked projection 38, and the other end of the latch lever 36 is connected by a tension spring 39 to a casing 40 containing a flexible diaphragm 41 clamped between discs 42 and 45, and from the disc 42 a rod 43 projects upwardly through the casing 40 so that the upper end of the rod 43 is in engagement with the underside of the latch lever 36. A compression spring 44 acts on the disc 42 so as to urge the disc 45 downwardly into contact with the base of the casing 40. The outlet of a pump 56 (FIG. 16) which is driven by a chain 58 from the pinion shaft 6, is connected to a port 46 in the casing 40 so that the pressure of oil from the pump, which pressure is only developed with the pinion 6 ahead rotation and is definitely related to the speed of the pinion, acts on the underside of the diaphragm 41 and urges it upwardly against the action of the spring 44. The pump 56, which draws from a pump 57 may be a centrifugal pump or a positive displacement pump circulating oil through a calibrated nozzle. A relief valve 58 is provided to avoid excess pressure on the diaphragm 41, *i.e.* pressure substantially higher than is required to unlock the latch 38.

The clutch control lever 29 carries a stop pin 32' for limiting the upward movement of the latch lever 31.

Figure 8:
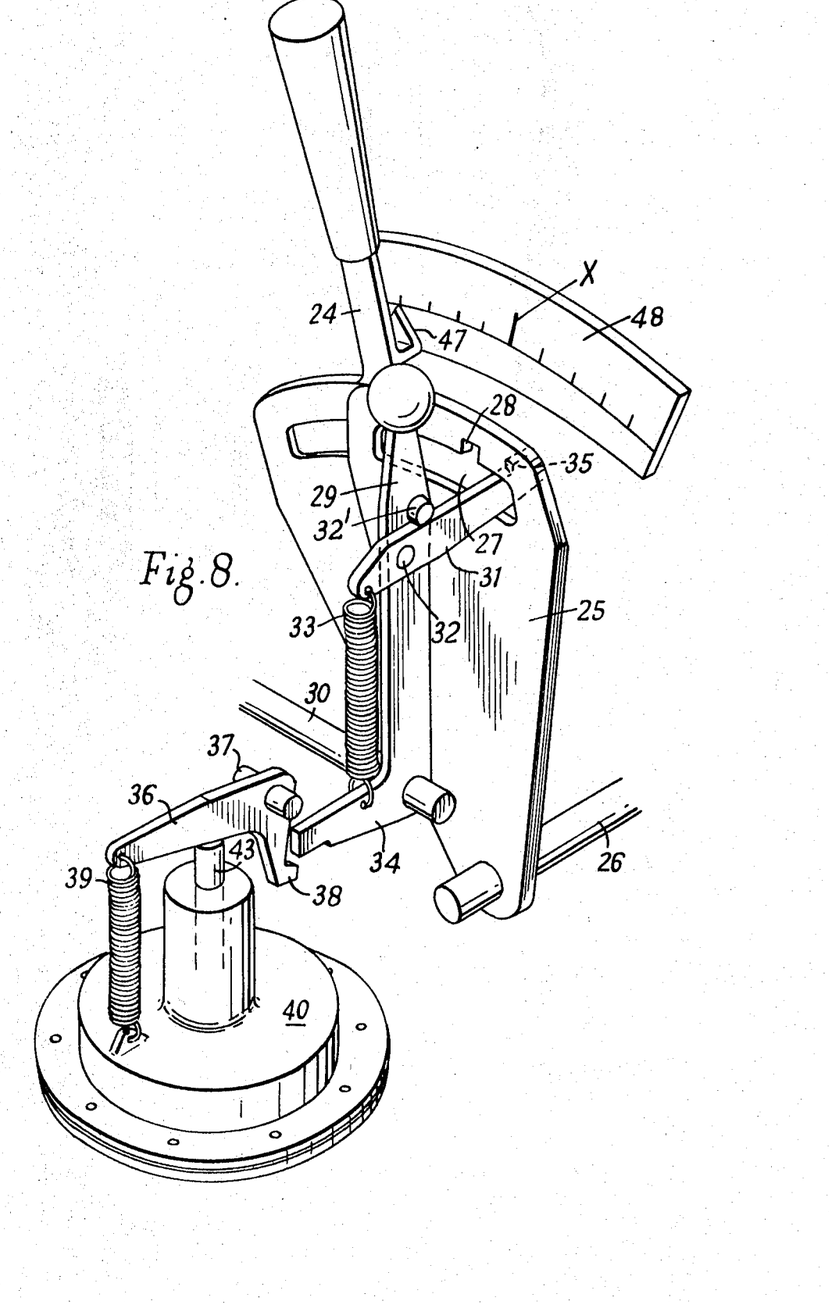
FIGS. 8, 9 and 10 are isometric views of the control mechanism under three different operating conditions, FIG. 10 showing the said interlock diaphragm casing in section.

The engine power control lever 24 carries a pointer 47 that cooperates with a fixed scale 48 marked with the four ahead and astern engine speeds that are conventionally used. The central marking X corresponds to "STOP", the markings on the left-hand side of the scale 48 as seen in FIG. 8 correspond, reading outwardly from the "STOP" marking, to ahead speeds "DEAD SLOW", "SLOW", "HALF SPEED" and "FULL SPEED", and the markings on the right-hand side of the scale correspond, reading outwardly from the "STOP" marking, to the four astern speeds "DEAD SLOW", "SLOW", "HALF SPEED" and "FULL SPEED".

The operation is as follows, in the case of a twin-engined vessel for example wherein only one engine 51 is in service and the control of the engine is described for the engagement of the clutch 2. With the engine at full load (control lever 24 in the extreme left-hand position as shown in FIG. 8) and with the multiple tooth clutch 2 disengaged (FIG. 1) the turbocoupling 1 is full and the speed of the propeller 55 will be say 70 percent of full speed. At this relatively high propeller speed the oil pressure supplied by the pump 56 and applied to the underside of the diaphragm 41 is sufficiently high to keep the diaphragm raised against the pressure of the spring 44, so that under the action of the rod 43 the latch lever 36 is in the unlocked position shown in FIG. 8 in which the projection 38 is disengaged from the end of the arm 34 of the clutch control lever 29. However, the clutch control lever 29 cannot be operated to engage the clutch 2 because, as shown in FIG. 8, the projection 35 is not aligned with the notched recess 28 and the latch lever 31 cannot be moved away from the quadrant 25 to operate the clutch via the servomotor 23 and the piston rod 22.

Figure 9:
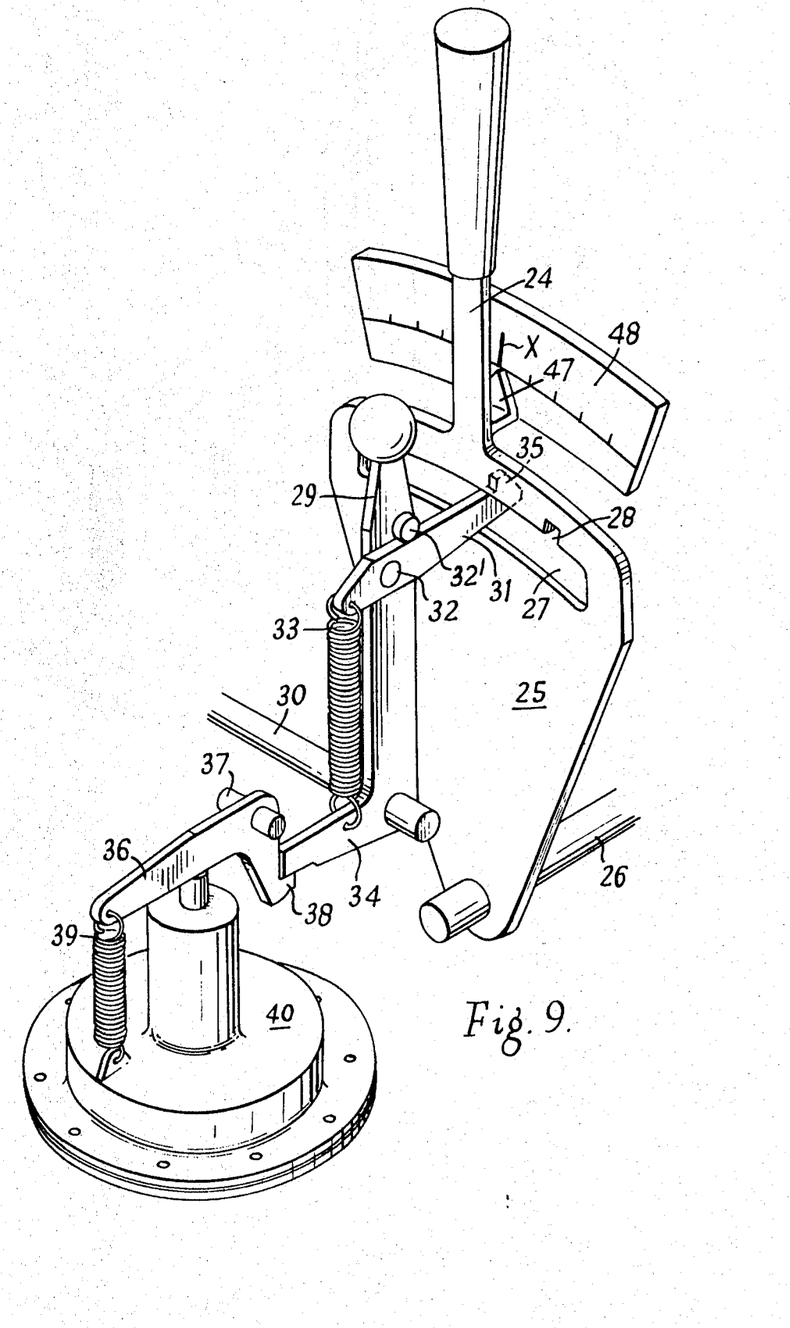
Figure 10:
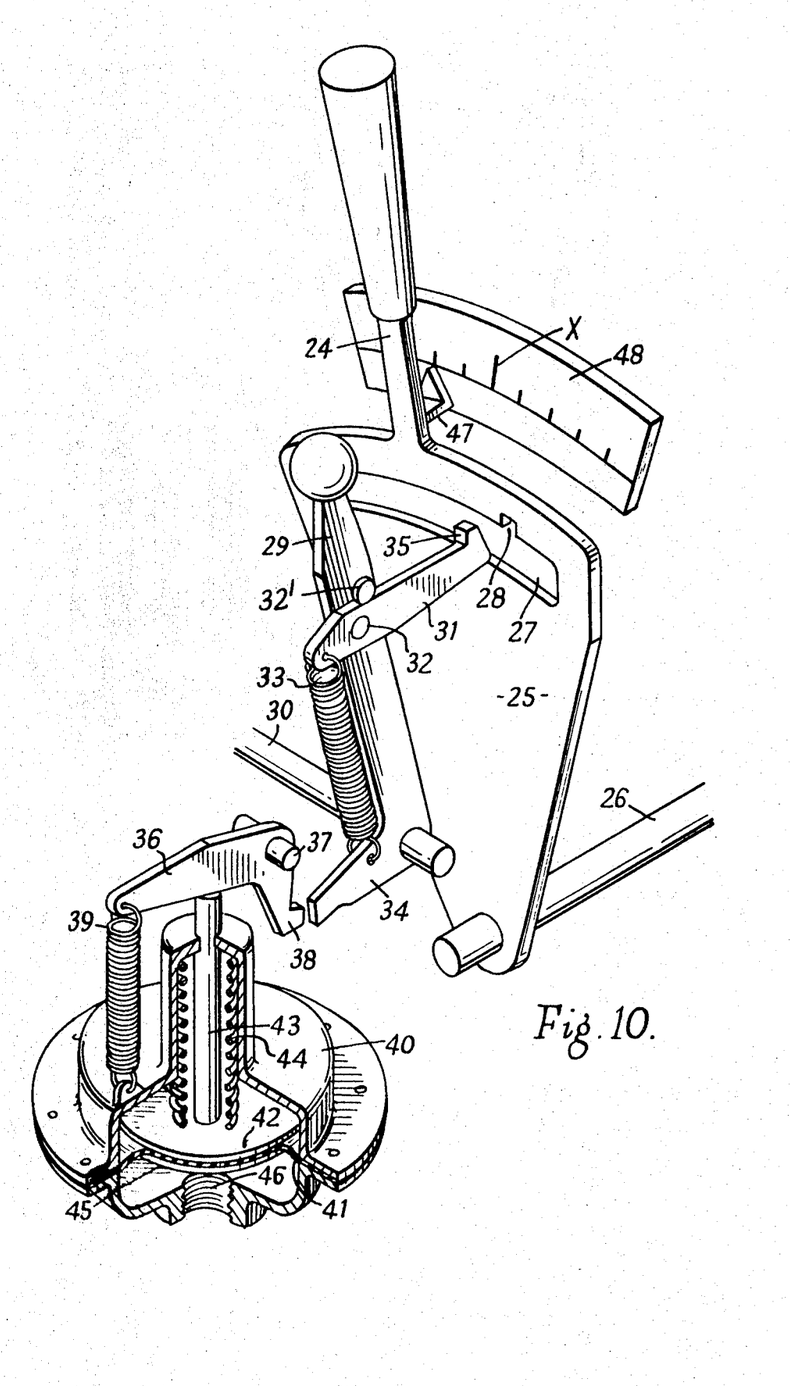

In order to engage the clutch 2, the engine power control lever is moved back from the "FULL" speed setting to the "SLOW" speed setting (FIG. 10), in which the projection 35 is aligned with the notched recess 28 and the clutch control lever 29 can be moved away from the quadrant 25 to the position shown in FIG. 10, the projection 35 passing freely through the notched recess 28. The rotation of the rod 30 caused by the movement of the clutch control lever 29 actuates the control valve (not shown) of the servomotor 23 so that the clutch-actuating lever 21 shifts the clutch sleeve 16 to the right in FIG. 1 to bring the clutch teeth 17 into end-nuzzling contact with the clutch teeth 11 (FIG. 4). The movement of the clutch control lever 29 must follow shortly after the movement of the engine power control lever 24 to the "SLOW" setting, *viz.* before the speed of the propeller 55 and hence of the pump 56 driven by the pinion shaft 6 has fallen to the extent that the oil pressure beneath the diaphragm 41 is unable to hold the diaphragm up against the pressure of the spring 44, since downward movement of the diaphragm 41 would enable the bellcrank latch lever 36 to turn so as to bring the projection 38 beneath the end of the arm (FIG. 9) and thereby prevent the clutch control lever 29 from being moved. When the clutch control lever 29 is moved sufficiently quickly, *viz.* before the speeds of the engine 1 and of the runner 5 of the turbocoupling have fallen appreciably, the clutch teeth 17 are brought into end-nuzzling contact with the clutch teeth 11 whilst the impeller 3 of the turbocoupling is still rotating slightly faster than the runner, and the torque in the turbocoupling is at a greatly reduced value due to the part closing of the engine fuel control and is still in the positive direction as indicated by the arrow in FIG. 4. The differential speed of rotation in the turbocoupling, *i.e.* the difference in the speeds of the impeller 3 and runner 5 is very low because of the low torque condition, whereas the rotational speed is relatively high such that the clutch teeth 17 move at a very low speed past the clutch teeth 11 in nuzzling contact therewith, and when teeth 17 come opposite to the gaps between teeth 11 the teeth 17 slide into driving engagement with the teeth 11, under the actuating force of the servomotor 23.

The movement of the engine power control lever 24 from "FULL" speed ahead to "SLOW" speed ahead, followed immediately by movement of the clutch control lever 29 to the setting for engagement of the clutch, will ensure that the powerful synchronising effect of the turbocoupling is present at the aforementioned relatively high speed of the turbocoupling, hence with a very low percentage slip, initially in the positive sense, hence with a very low differential speed of the clutch teeth 17 and 11, *viz.* of the order of one revolution in 20/30 seconds. These conditions are sustained for a while by the above-mentioned powerful synchronising effect of the turbocoupling, and are very favourable for clutch engagement, which is followed by normal usage of lever 24.

Figure 11:
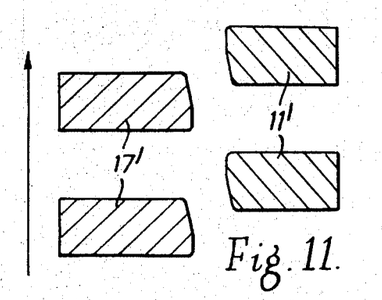
FIGS. 11, 12 and 13 are development views of interengageable clutch teeth in an embodiment of the invention in which the said teeth are chamfered, the FIGS. showing the teeth disengaged, ratchetting, and fully interengaged under negative torque respectively.
Figure 12:
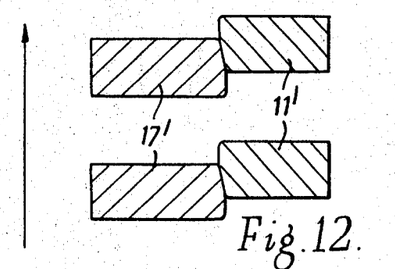
Figure 13:
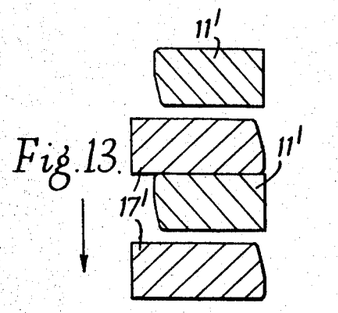

FIGS. 11, 12 and 13 illustrate the use of chamfered teeth 11' and 17' which may be used in the clutch 2 instead of the flat-ended teeth 11 and 17. The chamfers illustrated are positive, *i.e.* when the teeth 17' are urged into end-nuzzling contact with the teeth 11' the chamfers baulk engagement (FIG. 12) under conditions of positive slip as indicated by the long arrow. Under conditions of negative slip, *i.e.* when the slip in the turbocoupling has passed slowly through zero and become negative, as shown by the short arrow (FIG. 13) the teeth 17' and 11' make partial flank engagement; thus, at the very low differential speed of the clutch 17' and 11', the teeth 17' can slide into full interengagement with the teeth 11'.

It will be understood that a converse arrangement of the chamfers may be adopted if it is preferred to arrange the control so that interengagement of the clutch teeth is baulked under conditions of negative slip, *i.e.* if the speed of operation of the servocylinder is suitably restricted to a slow movement, the teeth 17' then being adapted for interengagement with the teeth 11' after the delayed condition when the slip reverses, *viz.* becomes positive again after passing through zero while the speed of the pinion shaft 6 is continuing to decrease slowly relative to the impeller shaft 4.

Figure 14:
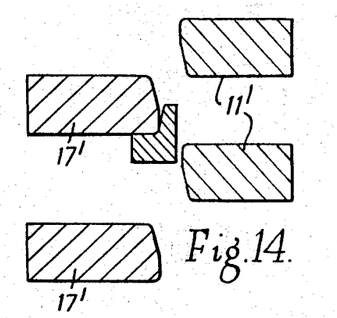
FIGS. 14 and 15 illustrate the use of a baulking ring as a protective device against maloperation of the clutch.
Figure 15:
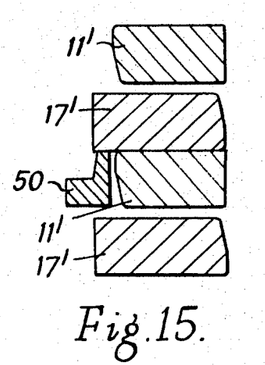

FIGS. 14 and 15 illustrate the use of a baulking ring, known in itself, formed with say six teeth one of which is shown at 50, the baulking ring being carried by and rotatable relative to the driven clutch part on which the chamfered teeth 11' are formed. The object of the baulking ring is to prevent the clutch teeth 17' from being shifted into end face contact with the clutch teeth 11' under completely abnormal and exceptional circumstances, *e.g.* maloperation of the controls, wherein the relative rotation of the clutch elements is inappropriate, and could lead to heavy corner to corner impact of the teeth 17' and 11'. In the case illustrated, interengagement of the clutch teeth is positively prevented under conditions of negative slip, such as could occur in the case of a twin-engined vessel when one engine is stopped with the associated turbocoupling empty, and by some control failure, *e.g.* due to serious maladjustment or grave interference with the control interlock latches 31 and 35 or 36 and 38 in FIGS. 8, 9 and 10 such that the clutch teeth 17' are moved towards engagement with the clutch 11' whilst these are rotating owing to the vessel being propelled by the other engine. Similarly a baulking ring may also be provided in a clutch having flat-ended teeth as shown in FIGS. 3, 4 and 5 as a safeguard against possible contact of the clutch teeth under incorrect conditions for clutch actuation, *e.g.* due to interference with the control system.

The disengagement of the clutch when required, *e.g.* for execution of a crash astern order, or prior to commencement of manoeuvring, or when shutting down the associated engine, is preferably effected with the control levers in the positions shown in FIG. 10, but this is not essential since the hooked projections 35 and 38 on the interlock latch levers 31 and 36 are chamfered to permit the clutch control lever 29 to be moved back to the clutch disengaged position as in FIGS. 8 and 9 in any setting of the engine power control lever 24, or of the diaphragm actuated interlock lever 36.

The fluid pressure for actuating the servocylinder 23 may conveniently be oil pressure derived from the gearbox lubricating oil system, which incorporates a standby oil pumps; or may be pneumatic pressure derived from the engine control system, with its standby air supply.

I claim:

1. A marine propulsion system comprising at least one reversible engine, power output control means for said engine, a fixed pitch propeller, a pinion shaft drivably connected to said propeller, a hydraulic turbocoupling of the type that includes an impeller and a runner and in which the working circuit can be selectively filled and emptied, a toothed clutch, volitionally operable clutch control means for selectively engaging and disengaging said clutch, said turbocoupling and said clutch being connected in parallel with one another between said engine and said pinion shaft, and the improvement that includes first additional control means associated with said clutch control means and effective to permit operation of said clutch control means to actuate said clutch towards the engaged condition for direct drive of said propeller by said engine only when said pinion shaft is in a condition of rotation corresponding to ahead motion of the vessel at at least a predetermined high speed, and second additional control means associated with said engine power control means and effective to permit operation of said clutch control means to actuate said clutch towards the engaged condition only when said engine power output control means are set for ahead propulsion of the vessel, at a predetermined setting that corresponds to less than full engine power.

2. A marine propulsion system according to claim 1, wherein said first additional control means include a detent, means biassing said detent to an operative position in which actuation of said clutch control means to engage said clutch is prevented, means for generating a force related to the speed of rotation of said pinion shaft, and means for applying said force in opposition to said biassing means whereby said detent is moved from said operative position when said biassing means are overcome by said force.

3. A marine propulsion system according to claim 1 wherein said clutch includes interengageable teeth the facing ends of which are substantially flat.

4. A marine propulsion system according to claim 1 wherein said clutch has interengageable teeth the facing ends of which are chamfered in the direction to baulk interengagement of said clutch teeth prior to reversal of torque and slip from positive to negative in said turbocoupling and to facilitate interengagement of said clutch teeth after such reversal of torque and slip.